Figure 1:
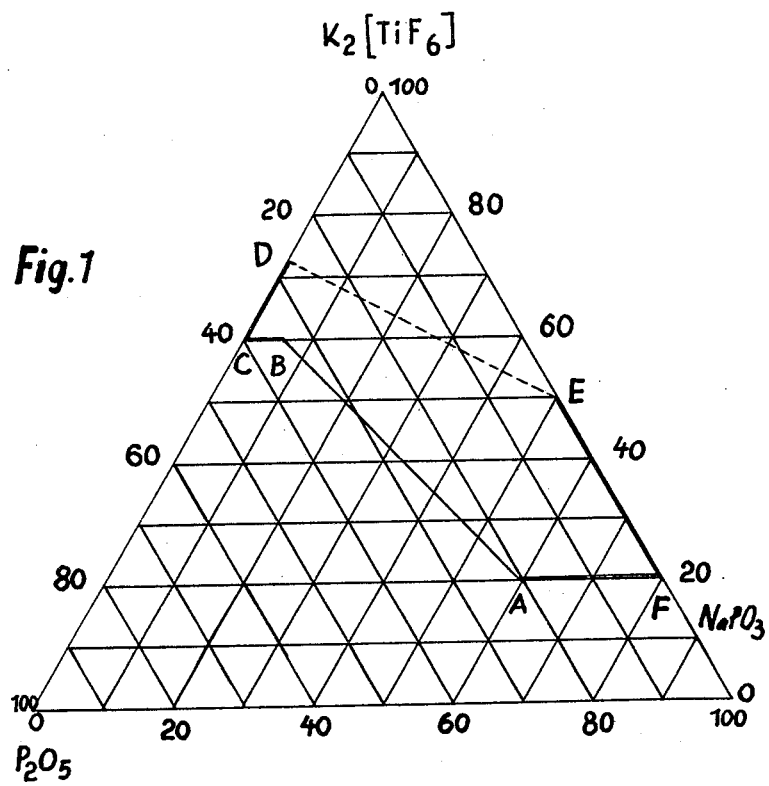

United States Patent Office 3,068,108
Patented Dec. 11, 1962

3,068,108
OPTICAL TYPE GLASS COMPOSITIONS WITH HIGH FLUORINE AND TITANIUM CONTENT
Walter Geffcken, Mainz, Germany, assignor to Jenaer Glaswerk Schott & Gen., Mainz, Germany, a corporation of Germany
Filed Feb. 3, 1959, Ser. No. 790,913
Claims priority, application Germany Feb. 5, 1958
6 Claims. (Cl. 106—47)

The present invention relates to optical glass having a high content of fluorine and titanium.

For preventing chromatic aberrations in lens systems, it is very important that such lenses consist of a glass which at a low or medium refractive index has a very high dispersion. Such a type of glass which is often called a "low-flint" glass always contains considerable amounts of titanium and alkali. The various species of this glass which are commercially available further contain considerable amounts of fluorine and silicic acid. There have also been proposals of other species of such a glass which contain phosphoric acid in place of the silicic acid, but are free of fluorine, while still other species are composed according to the formula

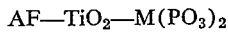
AF—$TiO_2$—$M(PO_3)_2$ in which AF means a fluoride, preferably of an alkali metal, and $M(PO_3)_2$ means the meta or ortho phosphate of aluminum or beryllium.

Although glass species of the first-mentioned kind have very valuable properties, their attainable range within the $n_d$–$\nu$ diagram is still not sufficient to satisfy all demands. Such a glass also has the disadvantage that at extreme optical positions it will produce undesirable brown discolorations.

These same limitations are also applicable to glass species which are free of fluorine and in which the vitrifier consists of $P_2O_5$. Although according to one prior disclosure, the glass species according to the formula

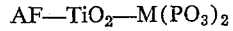
AF—$TiO_2$—$M(PO_3)_2$ are supposed to have the desired optical position, it has not been possible by this disclosure to produce such a glass in a quantity and quality adequate for optical purposes since it has an extremely strong tendency toward crystallization.

It is an object of the present invention to provide new glass species of an especially valuable optical position and a good stability against crystallizing as well as a total absence of coloring. This may be attained according to the invention by melting a mixture which may be demonstrated by a diagram representing the three-component system $K_2[TiF_6]$—$NaPO_3$—$P_2O_5$ and limited by a range defined by a rectilinear connection of the points A (20/60/20), B (60/6/34), C (60/0/40), D (73/0/27), E (50/50/0), and F (20/80/0), wherein the three numerical values in parentheses indicate the content in $K_2TiF_6$, $NaPO_3$, and $P_2O_5$, respectively, in percent by weight. The connection of points C, B, A, and F limits the glass range according to the invention from that in which a strong crystallization would occur while the connection of points D and E limits the glass range from those ranges in which the glass would be strongly hygroscopic.

Figure 2:
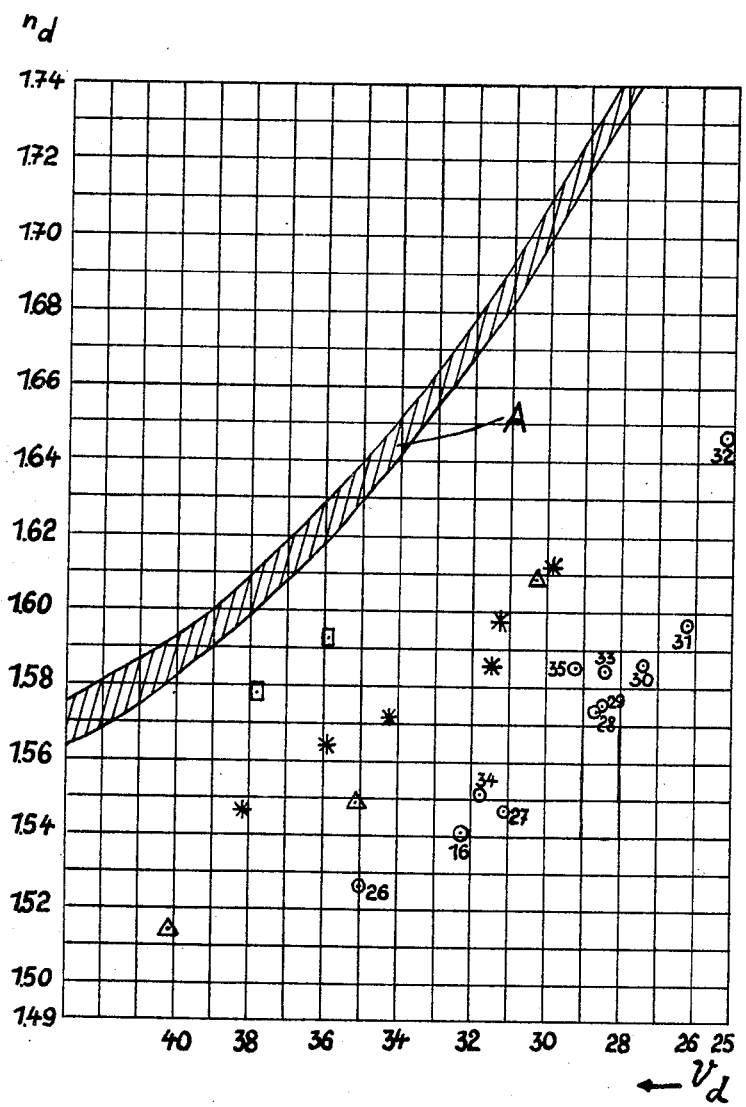

In the accompanying drawings, FIGURE 1 illustrates the mentioned glass range in a system of triangular coordinates, and a few examples of the glass defined by this range are indicated in the table at the end of this description; while FIGURE 2 shows the optical position of some species of the new glass according to the table in comparison with some of those disclosed by the prior art.

The sodium content in the new glass may be exchanged for potassium or vice versa in the same molar ratio without thereby causing any noticeable changes in the properties of the glass.

Referring to FIGURE 1, the glass species disclosed herein have an extremely low melting point; in the vicinity of the border line D—E they will be very soft and their water and acid solubility will be considerable. In the production of this glass, it will therefore be advisable to remain within the vicinity of the border lines A—B—C—D. Especially the glass species in the vicinity of the line B—C have excellent chemical and mechanical properties. The stability of such a glass may be improved by replacing a portion of the $P_2O_5$ by $Sb_2O_3$ in the same molar ratio. The quantity added may amount up to approximately 15% by weight. Such a replacement also has the advantage that the lack of any color of the glass will be maintained even though other materials are added; whereas in pure phosphate glass a champagne-like discoloration will often be noticeable.

Since the mentioned glass species have a relatively low refractive index $n_d$ of up to approximately 1.53, a portion of the alkali oxide may be exchanged by PbO or $Bi_2O_3$ in the same molar ratio. Such an exchange may amount up to 20% by weight of PbO or $Bi_2O_3$.

Especially valuable glass species may be attained by adding up to 12% of $TiO_2$ to those species which consist of $K_2[TiF_6]$, $NaPO_3$, $P_2O_5$, and $As_2O_3$ and which may be regarded as the basic glass. This will result in glass species which excel over all kinds of glass previously known insofar as their optical position is concerned. When applying pure raw materials, these glass species may be produced absolutely without color.

In order to increase the chemical resistance of the new glass, additional substances such as MgO or ZnO, preferably in quantities of up to 10% by weight, and especially $Ta_2O_5$, $Nb_2O_5$, or $WO_3$, preferably in quantities of up to 20% by weight may also be added to the basic glass composition. It is also possible to add small amounts of molybdenum. However, contrary to the prior prescription for producing a glass of the composition

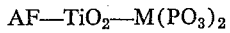
AF—$TiO_2$—$M(PO_3)_2$ as mentioned at the beginning, even very small amounts of $Al_2O_3$ will result in a very strong increase in the tendency of the glass toward crystallization. Furthermore, the undesirable low softening or fusing point as well as the hardness of the new glass species may be increased by exchanging up to approximately 5% by weight of $P_2O_5$ by $SiO_2$. Rare substances such as indium oxide or germanium oxide may be incorporated although no particular advantages will thereby be attained. Thallium oxide should be omitted because of its toxicity. However, $TeO_2$ and $As_2O_3$ may be added. There is no absolute necessity to introduce the entire quantity of fluorine in the form of $K_2TiF_6$, but a part thereof may also be added in the form of NaF, KF, $PbF_2$, and the like so that a part of the titanium will be introduced in the form of $TiO_2$. This modification may be easily determined by calculation; however it is not advisable since the

$K_2[TiF_6]$ is far more preferable as it forms a very pure raw material which may be easily melted.

The diagram according to FIGURE 2 indicates the optical position of some of the new glass species stated in the accompanying table in comparison to some of the similar glass species as disclosed by the prior art. In this diagram, A indicates normal flint glass; $\triangle$ indicates glass species according to the formula

AF—$TiO_2$—$M(PO_3)_2$

☐ indicates low-flint glass species which are commercially available; ★ indicates glass species containing $P_2O_5$ which are free of fluorine; while ○ indicates glass species according to the present invention.

Because of its thin fluidity, the glass according to the invention is preferably produced in a platinum crucible. The mixture is inserted therein at a temperature of 1000 to 1100° C. and is refined at approximately 1100° C. For a batch of 1 kg., a refining period of one-half hour will be sufficient. Since the molten material fumes very strongly, it is necessary to keep the crucible covered and to provide for a good ventilation therefrom. The material is stirred until it reaches approximately 500° C., then it is poured into molds and cooled at the lowest possible temperature. The most suitable cooling temperature for the different glass species may be easily ascertained by a test cooling in a so-called gradient furnace, that is, a furnace in which the temperature rises locally according to accurately perdetermined laws. If the cooling temperature is made too high, the glass may become turbid.

The following table indicates some of the glass species as defined by the range A—B—C—D—E—F shown in FIGURE 1:

the system $K_2TiF_6$—$NaPO_3$—$P_2O_5+Sb_2O_3$, wherein the content in $K_2TiF_6$, $NaPO_3$ and $P_2O_5+Sb_2O_3$ respectively in weight percent is within the range defined by rectilinear connection of the points A (20/60/20), B (60/6/34), C (60/0/40), D (73/0/27), E (50/50/0) and F (20/80/0), said $Sb_2O_3$ being present in amount of 0–15% by weight, the total aggregate $P_2O_5+Sb_2O_3$ not exceeding 40% by weight.

3. A fluophosphate titanium optical glass composition having a refraction index of about 1.51–1.64 and a dispersion of about 18.5–42.2, and essentially consisting of the system (I) $K_2TiF_6$, (II) a member of the group consisting of $NaPO_3$, mixtures of $NaPO_3$ and PbO, PbO, mixtures of $NaPO_3$ and $Bi_2O_3$, and $Bi_2O_3$, (III) $P_2O_5$, wherein the content in I, II and III respectively in weight percent is within the range defined by rectilinear connection of the points A (20/60/20), B (60/6/34), C (60/0/40), D (73/0/27), E (50/50/0) and F (20/80/0), said PbO and said $Bi_2O_3$ not being present in excess of 20% by weight and each not aggregating with said $NaPO_3$ in excess of 80% by weight.

4. A fluophosphate titanium optical glass composition

Table

[Contents in percent by weight]

| No. | $K_2TiF_6$ | $NaPO_3$ | $P_2O_5$ | $Sb_2O_3$ | $TiO_2$ | $WO_3$ | $Ta_2O_5$ | Other | $n_d$ | $\nu$ |
|---|---|---|---|---|---|---|---|---|---|---|
| 1 | 30 | 50 | 20 | | | | | | | |
| 2 | 40 | 35 | 25 | | | | | | | |
| 3 | 40 | 50 | 10 | | | | | | | 1.516 | 41.5 |
| 4 | 55 | 25 | 20 | | | | | | 1.508 | 42.2 |
| 5 | 55 | 20 | 25 | | | | | | 1.523 | 38.0 |
| 6 | 55 | 15 | 30 | | | | | | | |
| 7 | 60 | 10 | 30 | | | | | | | |
| 8 | 61 | 5 | 34 | | | | | | | |
| 9 | 62 | | 38 | | | | | | | |
| 10 | 65 | | 35 | | | | | | 1.521 | 38.1 |
| 11 | 70 | 5 | 25 | | | | | | | |
| 12 | 48 | 22 | 12 | 9 | 9 | | | | 1.599 | 27.4 |
| 13 | 30 | 40 | 12 | 10 | 8 | | | | | |
| 14 | 40 | 33 | 9 | 10 | 8 | | | | 1.601 | 18.5 |
| 15 | 55 | 20 | 7 | 10 | 8 | | | | 1.576 | 28.3 |
| 16 | 60 | 15 | 7 | 10 | 8 | | | | 1.541 | 32.3 |
| 17 | 61 | 5 | 16 | 10 | 8 | | | $SiO_2$ 5.0 | | |
| 18 | 55 | 25 | 15 | | | 10 | | $Bi_2O_3$ 15.9 | 1.623 | 29.5 |
| 19 | 45 | | 30.9 | | | | 8.2 | | | |
| 20 | 46.2 | 21.0 | 11.8 | 12.6 | | | 8.4 | | | |
| 21 | 45.6 | 10.4 | 23.9 | | | | 8.3 | PbO 11.8 | 1.567 | 34.1 |
| 22 | 41.8 | | 28.7 | | | | 7.6 | PbO 21.7 | 1.632 | 29.6 |
| 23 | 47.9 | 21.8 | 17.4 | | | | 8.7 | ZnO 4.35 | 1.528 | 39.3 |
| 24 | 50.0 | 22.7 | 18.2 | | | | 9.1 | | 1.537 | 36.8 |
| 25 | 49.2 | 13.5 | 17.9 | | | | 8.9 | $KPO_3$ 10.5 | 1.520 | 39.2 |
| 26 | 55 | 30 | 2 | 10 | 3 | | | | 1.527 | 35.0 |
| 27 | 65 | | 20 | 10 | 5 | | | | 1.547 | 31.1 |
| 28 | 60 | 5 | 20 | 10 | 5 | | | | 1.574 | 28.7 |
| 29 | 50 | 30 | 2 | 10 | 8 | | | | 1.575 | 28.5 |
| 30 | 50 | 33 | | | 5 | 12 | | | 1.586 | 27.5 |
| 31 | 55 | 22 | 6 | 5 | 12 | | | | 1.597 | 26.5 |
| 32 | 30 | 40 | 13 | 5 | 12 | | | | 1.647 | 25.2 |
| 33 | 55 | 10 | 20 | 10 | 5 | | | | 1.584 | 28.4 |
| 34 | 50 | 30 | 5 | 10 | 5 | | | | 1.551 | 31.9 |
| 35 | 40 | 40 | 2 | 10 | 8 | | | | 1.585 | 29.3 |

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. A fluophosphate titanium optical glass composition having a refraction index of about 1.51–1.64 and a dispersion of about 18.5–42.2, and essentially consisting of the system $K_2TiF_6$—$NaPO_3$—$P_2O_5$, wherein the content in $K_2TiF_6$, $NaPO_3$ and $P_2O_5$ respectively in weight percent is within the range defined by rectilinear connection of the points A (20/60/20), B (60/6/34), C (60/0/40), D (73/0/27), E (50/50/0) and F (20/80/0).

2. A fluophosphate titanium optical glass composition having a refraction index of about 1.51–1.64 and a dispersion of about 18.5–42.2, and essentially consisting of having a refraction index of about 1.51–1.64 and a dispersion of about 18.5–42.2, and essentially consisting of the system (I) $K_2TiF_6$, (II) a member of the group consisting of $NaPO_3$, mixtures of $NaPO_3$ and PbO, PbO, mixtures of $NaPO_3$ and $Bi_2O_3$, and $Bi_2O_3$, (III)

$$P_2O_5+Sb_2O_3$$

wherein the content in I, II and III respectively in weight percent is within the range defined by rectilinear connection of the points A (20/60/20), B (60/6/34), C (60/0/40), D (73/0/27), E (50/50/0) and F (20/80/0), said $Sb_2O_3$ being present in amount of 0–15% by weight, the total aggregate $P_2O_5+Sb_2O_3$ not exceeding 40% by weight, said PbO and said $Bi_2O_3$ not being present in excess of 20% by weight and each not aggregating with said $NaPO_3$ in excess of 80% by weight.

5. A fluophosphate titanium optical glass composition having a refraction index of about 1.51–1.64 and a dispersion of about 18.5–42.2 and essentially consisting of the following in percentages by weight:

| | Percent |
|---|---|
| $K_2TiF_6$ | 20–73 |
| $NaPO_3$ | 0–80 |
| $P_2O_5$ | 0–40 |
| PbO | [1] 0–20 |
| $Bi_2O_3$ | [2] 0–20 |
| $Sb_2O_3$ | [3] 0–15 |
| $TiO_2$ | 0–15 |
| MgO | 0–10 |
| ZnO | 0–10 |
| $Ta_2O_5$ | 0–20 |
| $WO_3$ | 0–20 |

[1] Aggregating with said $NaPO_3$ calculated on a molar ratio with the alkali metal oxide therein not in excess of 80%.
[2] Aggregating with said $NaPO_3$ calculated on a molar ratio with the alkali metal oxide therein not in excess of 80%.
[3] Aggregating with said $P_2O_5$ not in excess of 40%.

said $K_2TiF_6$—$NaPO_3$—$P_2O_5$ essentially defining a system wherein the content in $K_2TiF_6$, $NaPO_3$ and $P_2O_5$ respectively in weight percent is within the range defined by rectilinear connection of the points A (20/60/20), B (60/6/34), C (60/0/40), D (73/0/27), E (50/50/0) and F (20/80/0), in the determination of said range said PbO and said $Bi_2O_3$ being considered as $NaPO_3$ calculated on a mol ratio with the alkali metal oxide therein and said $Sb_2O_3$ being considered as $P_2O_5$ on an equivalent mol ratio basis.

6. A fluophosphate glass containing titanium of a refractive index $n_d=1.551$ and an Abbe number of $\nu=31.9$, consisting of

| | Percent by weight |
|---|---|
| $K_2TiF_6$ | 50 |
| $NaPO_3$ | 30 |
| $P_2O_5$ | 5 |
| $Sb_2O_3$ | 10 |
| $TiO_2$ | 5 |

References Cited in the file of this patent

UNITED STATES PATENTS

| 2,430,539 | Sun | Nov. 11, 1947 |
| 2,716,069 | Pincus | Aug. 23, 1955 |
| 2,919,201 | Izumitani et al. | Dec. 29, 1959 |